A. SHULTZ.
TROLLEY.
APPLICATION FILED MAR. 18, 1921.
1,383,158.
Patented June 28, 1921.
2 SHEETS—SHEET 1.
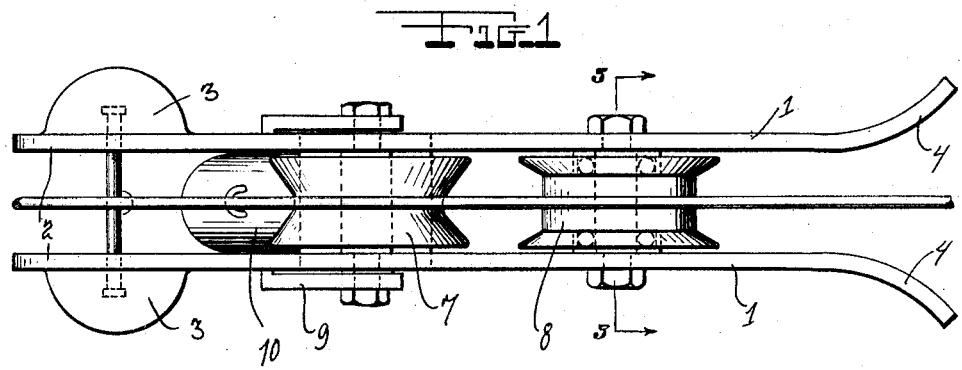
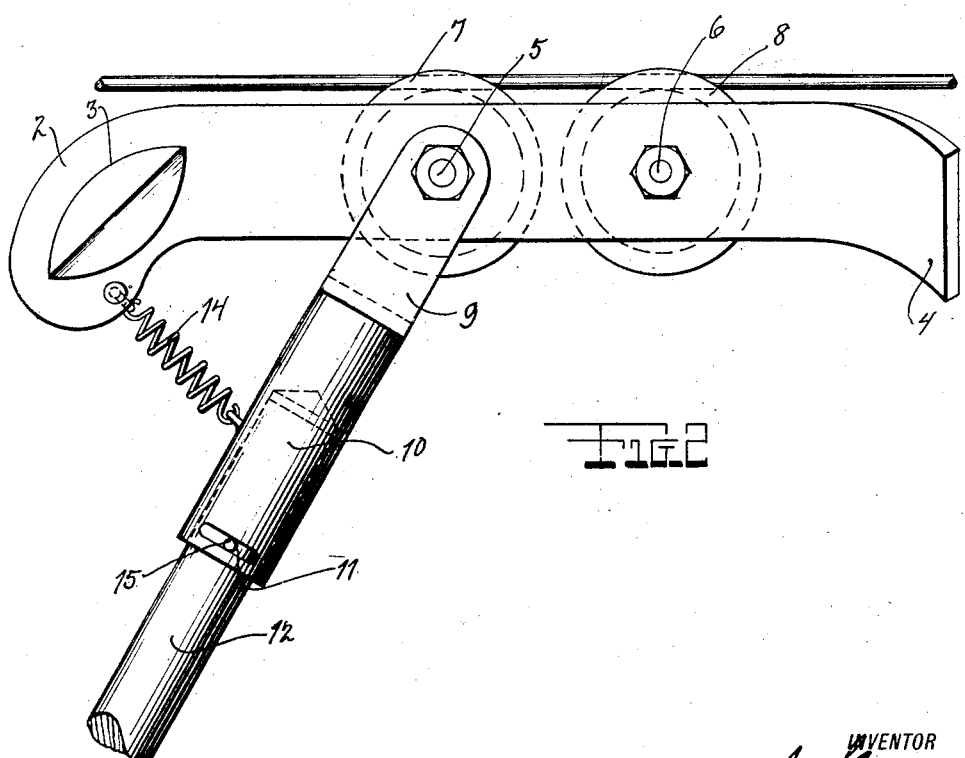

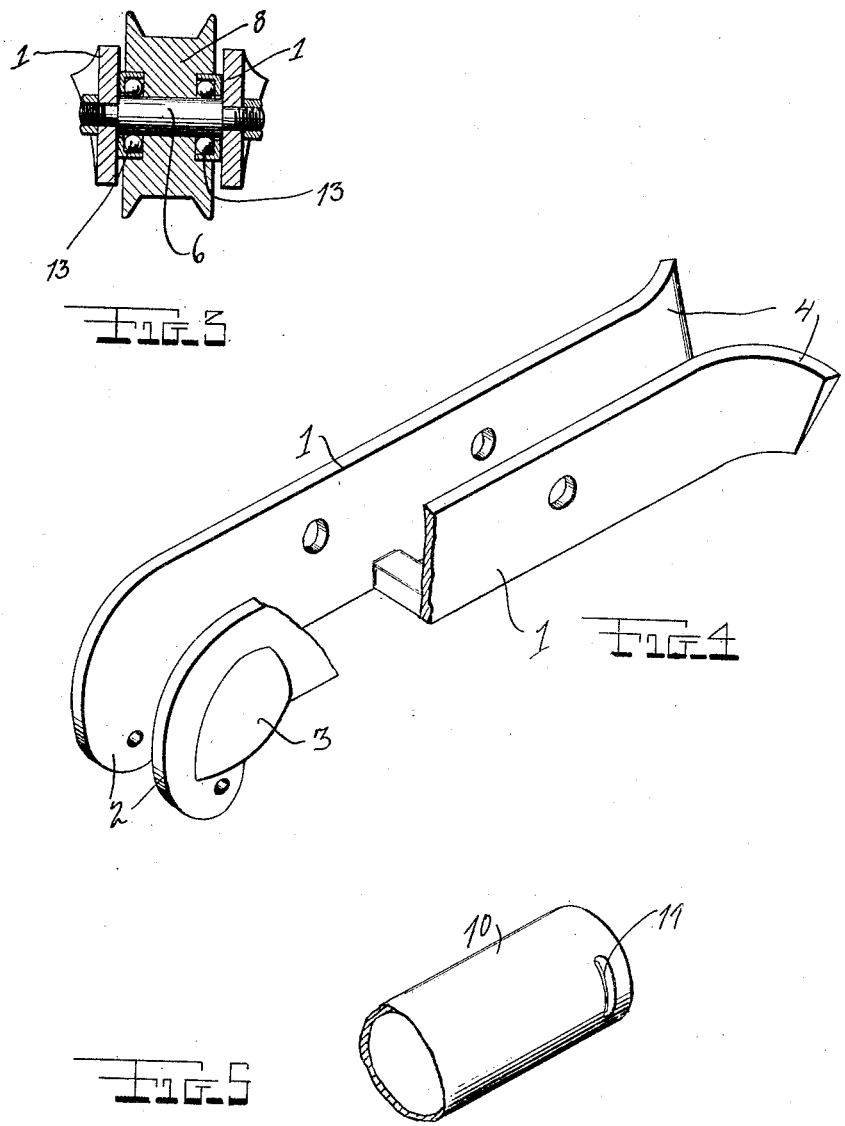

UNITED STATES PATENT OFFICE.

ADAM SHULTZ, OF WORCESTER, MASSACHUSETTS.

TROLLEY.

1,383,158.      Specification of Letters Patent.      Patented June 28, 1921.

Application filed March 18, 1921. Serial No. 453,276.

*To all whom it may concern:*

Be it known that I, ADAM SHULTZ, a citizen of Poland, residing at Worcester, in the county of Worcester and State of Massachusetts, have invented certain new and useful Improvements in Trolleys, of which the following is a specification.

The main object of this invention is the provision of a trolley wheel having automatic means for preventing the trolley from leaving the wire, and thereby assuring a continuous current through the trolley pole, and also preventing the delays and discomforts involved when a trolley leaves the wire.

The above and other objects will become apparent in the description below, in which like-named characters of reference refer to like-named parts in the drawings.

Referring briefly to the drawings, Figure 1 is a plan view of my device.

Fig. 2 is a side elevational view of the same.

Fig. 3 is a cross-sectional view on the line 3—3 of Fig. 1.

Fig. 4 is a perspective view, partly in section, of my guiding and supporting frame.

Fig. 5 is a perspective view, partly in section, of the dirigible sleeve secured to the trolley pole.

Referring now in detail to the drawings, the numeral 1 represents the side members of my guide and support, whose forward ends are curved downward at 2 and are provided with lateral ears 3, and whose rearward ends 4 are curved both downward and outward. Bearings are provided in the members 1 for the support of shafts 5 and 6 upon which are mounted wheels 7 and 8, respectively. Both wheels carry the current from the wire, while wheel 6, which is flat-grooved, serves to guide the device against the wire and to prevent its slipping off.

A U-shaped bridge 9 is secured to the ends of the shaft 5 and passes under the frame 1, said shaft being pivotable with respect to said bridge. The lower stem 10, integral with said bridge, is hollow and provided with a slot 11. The end of the trolley pole 12 is rotatably mounted within said stem, and a pin 15 on the former engages the slot 11 and limits the extreme motions of said pole therein.

A spring 14 connects the ends 2 of the members 1 with the stem 10, and normally urges the entire device in a counter-clockwise direction (Fig. 2). In Fig. 3 the trolley wheel 8 is shown mounted upon ball bearings 13, in order to diminish the friction thereon.

In operation, in case there is a tendency for the device to slip off the wire, the ends 4 of the members 1 will guide the wire and prevent slipping of the device, and, with the aid of the wheel 8, the device will quickly regain its steady position. In passing over a union in the wire, it is obvious that the provision of the spaced apart wheels 7 and 8 prevents a break in the continuity of the current flow.

I claim:

1. A device of the class described comprising a frame having a pair of parallel side members, the rear ends of said members being curved outward, trolley wheels mounted in said frame, one of said wheels having a relatively wide groove having a substantially cylindrical bottom, a member pivotally attached to the underside of said frame, said member being adapted to be secured upon a trolley pole, and means for urging said frame to rotate to retain one of said wheels against the trolley wire.

2. A device of the class described comprising a frame having a pair of parallel side members, trolley wheels mounted in said frame, a substantially tubular member pivotally attached to the underside of said frame, said member being adapted to be secured upon a trolley pole, a slot in said member, a pin on said pole lying in engagement with said slot, and resilient means connecting one end of said frame with said member normally urging said frame to rotate.

In witness whereof I affix my signature.

ADAM SHULTZ.